Patented Nov. 3, 1942

2,301,002

UNITED STATES PATENT OFFICE 2,301,002

DERIVATIVES OF METAL COMPLEX COMPOUNDS OF SULPHURIZED PHENOLS

Werner Zerweck and Heinrich Ritter, Frankfort-on-the-Main-Fechenheim, Germany, assignors to General Aniline & Film Corporation, New York, N. Y., a corporation of Delaware No Drawing. Application August 20, 1940, Serial No. 353,388. In Germany July 28, 1939

2 Claims. (Cl. 260—137)

The present invention relates to new derivatives of metal complex compounds of sulphurized phenols. More particularly it relates to those derivatives of said compounds which are obtained by acting with a sulphurous acid salt on metal complex compounds of sulphurized phenols, especially tin complex compounds obtained by the action of sulphur and alkalis thereupon.

Metal complex compounds of sulphurized phenols suitable as initial materials for the manufacture of the present new compounds have been described in the literature, since they are valuable mordants for cellulosic fibers. Furthermore, they possess the valuable property of reserving wool from taking up acid and neutral dyestuffs in the dyeing of mixed fabrics. They can be prepared for instance according to the process of U. S. Patent 1,912,296 by melting a sulphurized phenolic compound with a phenolic compound free from nitrogen in the presence of a water-soluble tin compound. They can also be obtained by heating a phenolic compound free from nitrogen with sulphur in the presence of an alkali hydroxide together with a water-soluble tin compound.

According to our present invention new valuable derivatives of the aforesaid metal complex compounds of sulphurized phenols are obtained by treating them with a sulphurous acid salt. This treatment can be performed either by acting with a sulphurous acid salt on the isolated pure metal complex compounds of sulphurized phenols or by adding a sulphurous acid salt to the reaction mixtures which are obtained when preparing the metal complex compounds of sulphurized phenols according to one of the above described known methods.

The new products thus obtained are distinguished from the initial materials by a better solubility in water and by a better fastness to light of wool that has been treated therewith. Moreover cellulosic fibers in mixed fabrics with wool remain in a higher degree uncolored when treating the fabrics with the new compounds instead of the known products.

From our present knowledge we can not give a structural formula of the new compounds, since we are not able to determine conclusively how the reaction proceeds when a sulphurous acid salt is allowed to act on a metal complex compound of a sulphurized phenol.

In order to further illustrate our invention the following example is given, the parts being by weight and the temperatures in centrigrade degrees.

Example 500 parts of phenol and 380 parts of an aqueous sodium hydroxide solution of 50 per cent contents are heated to about 90 to 100°, 180 parts of stannous chloride and 260 parts of sulphur are added and the mixture is heated to about 120 to 125° for about 8 hours.

The reaction mixture thus obtained is dissolved in about 1500 parts of water, 150 parts of sodium sulphite are added and the solution is heated to 100 to 110° for about one hour. Hereafter the solution is evaporated in vacuo at about 100 to 110° until dry. In this way a light greyish-green powder is obtained which is easily soluble in water. It is an excellent reserving agent for wool and leaves cotton absolutely un-colored when employed on mixed fabrics of cotton and wool. Moreover, it is distinguished by a better fastness to light of the wool fibers treated therewith when compared with those treated by means of one of the known products.

We claim:

1. Derivatives of tin complex compounds of sulphurized phenols obtained by heating phenol, sulphur and a water-soluble tin compound in an alkaline medium to produce a water-soluble tin complex of the sulphurized phenol and heating the resulting tin complex with a sulphurous acid salt, said derivatives being light greyish-green powders, soluble in water and characterized by the property of being excellent reserving agents for wool.

2. Derivatives of tin complex compounds of sulphurized phenols obtained by heating phenol, sulphur and a water-soluble tin compound in an alkaline medium to produce a water-soluble tin complex of the sulphurized phenol and heating the resulting tin complex with sodium sulphite, said derivatives being light greyish-green powders, soluble in water and characterized by the property of being excellent reserving agents for wool.

WERNER ZERWECK.
HEINRICH RITTER.